US011339825B2

(12) United States Patent
Werner et al.

(10) Patent No.: US 11,339,825 B2
(45) Date of Patent: May 24, 2022

(54) BEARING FOR A SUPPORT MOUNT

(71) Applicant: VIBRACOUSTIC GMBH, Darmstadt (DE)

(72) Inventors: Philipp Werner, Lueneburg (DE); Hilrich Kardoes, Winsen (DE)

(73) Assignee: Vibracoustic SE, Darmstadt (DE)

(*) Notice: Subject to any disclaimer, the term of this patent is extended or adjusted under 35 U.S.C. 154(b) by 242 days.

(21) Appl. No.: 16/499,959

(22) PCT Filed: Mar. 29, 2018

(86) PCT No.: PCT/EP2018/058173
§ 371 (c)(1),
(2) Date: Oct. 1, 2019

(87) PCT Pub. No.: WO2018/185006
PCT Pub. Date: Oct. 11, 2018

(65) Prior Publication Data
US 2021/0131489 A1 May 6, 2021

(30) Foreign Application Priority Data

Apr. 3, 2017 (DE) ..................... 10 2017 107 135.0

(51) Int. Cl.
*F16C 19/10* (2006.01)
*B60G 15/06* (2006.01)
(Continued)

(52) U.S. Cl.
CPC ............ *F16C 19/10* (2013.01); *B60G 15/068* (2013.01); *F16C 33/74* (2013.01); *F16C 33/76* (2013.01);
(Continued)

(58) Field of Classification Search
CPC .......... F16C 19/10; F16C 33/74; F16C 33/76; F16C 2326/05; B60G 15/068; B60G 2204/124; B60G 2204/418; F16J 15/4472
See application file for complete search history.

(56) References Cited

U.S. PATENT DOCUMENTS 3,940,153 A    2/1976   Stocker
5,618,116 A *  4/1997   Ishikawa ................. F16C 19/10
                                                          277/361
(Continued)

FOREIGN PATENT DOCUMENTS

CN    102046404 A    5/2011
CN    102822542 A    12/2012
(Continued)

OTHER PUBLICATIONS

International Search Report, PCT/EP2018/058173, dated Jun. 18, 2018.
CN Search Report, 2018800145384, dated Mar. 24, 2020.

*Primary Examiner* — Darlene P Condra
(74) *Attorney, Agent, or Firm* — Fishman Stewart PLLC

(57) ABSTRACT

A bearing includes a first housing part and a second housing part. A housing gap is formed between the first housing part and the second housing part, and a bearing unit is arranged in the housing gap. In embodiments, a sealing system is provided that seals the housing gap. The sealing system may include at least one first sealing lip that is designed such that it can pivot. In embodiments, a first sealing lip is at a distance from the first housing part and/or the second housing part in the non-sealing state, and for sealing the housing gap, the first sealing lip may pivot and come into contact with the first housing part and/or the second housing part.

13 Claims, 3 Drawing Sheets

(51) Int. Cl.
*F16C 33/74* (2006.01)
*F16C 33/76* (2006.01)
*F16J 15/447* (2006.01)

(52) U.S. Cl.
CPC ..... *F16J 15/4472* (2013.01); *B60G 2204/124* (2013.01); *B60G 2204/418* (2013.01); *F16C 2326/05* (2013.01)

(56) References Cited

U.S. PATENT DOCUMENTS

| | | | |
|---|---|---|---|
| 6,637,754 B1* | 10/2003 | Ohtsuki | F16C 19/186 |
| | | | 277/549 |
| 7,909,333 B2* | 3/2011 | Greca | F16J 15/3264 |
| | | | 277/349 |
| 8,348,291 B1 | 1/2013 | Sedman et al. | |
| 8,496,235 B2 | 7/2013 | Viault et al. | |
| 8,506,171 B2 | 8/2013 | Stautner et al. | |
| 9,010,741 B2 | 4/2015 | Viault et al. | |
| 9,140,365 B1* | 9/2015 | Reimer | E02F 9/006 |
| 9,247,715 B2* | 2/2016 | Jaw | A01K 27/001 |
| 9,261,134 B2 | 2/2016 | Morishige et al. | |
| 10,006,503 B2 | 6/2018 | Aihara | |
| 10,030,777 B2* | 7/2018 | Rippel | F16J 15/002 |
| 10,208,800 B2* | 2/2019 | Yano | F16C 33/7859 |
| 10,948,017 B2* | 3/2021 | Kanzaki | F16C 33/7889 |
| 2005/0008276 A1 | 1/2005 | Beghini et al. | |
| 2008/0169611 A1* | 7/2008 | Greca | F16J 15/3264 |
| | | | 277/407 |
| 2012/0146306 A1 | 6/2012 | Dubus et al. | |
| 2012/0189237 A1 | 7/2012 | Montboeuf et al. | |
| 2012/0213464 A1 | 8/2012 | Stautner et al. | |
| 2013/0064489 A1 | 3/2013 | Corbett et al. | |
| 2014/0023307 A1* | 1/2014 | Stautner | B60G 15/068 |
| | | | 384/615 |
| 2015/0367698 A1 | 12/2015 | Stautner et al. | |
| 2018/0347704 A1* | 12/2018 | Rippel | F16J 15/4472 |
| 2019/0085900 A1* | 3/2019 | Voisine | F16C 23/046 |

FOREIGN PATENT DOCUMENTS

| | | |
|---|---|---|
| CN | 103089804 A | 5/2013 |
| DE | 112009000466 T5 | 2/2011 |
| DE | 102011004334 A1 | 8/2012 |
| EP | 3085980 A1 | 10/2016 |
| FR | 2965028 A1 | 3/2012 |
| WO | 2015/199022 A1 | 12/2015 |

* cited by examiner

BEARING FOR A SUPPORT MOUNT

CROSS-REFERENCE TO RELATED APPLICATIONS

This application is a National Stage Patent Application of International Patent Application No. PCT/EP2018/058173, filed Mar. 29, 2018, which claims the benefit of German Application Serial No. 10 2017 107 135.0, filed Apr. 3, 2017, the contents of each are incorporated by reference in their entireties.

TECHNICAL FIELD

The present invention relates to a bearing for a support mount, having a first housing part and a second housing part, between which a housing gap is formed, wherein a bearing device is arranged in the housing gap, wherein a sealing system is provided which seals the housing gap.

BACKGROUND

A bearing of the type mentioned above is used in a steered axle support mount in order to allow rotation between a vehicle body and a spring which may be part of a strut, in particular a McPherson strut.

To this end, the bearing is accommodated in a support mount, which may also be referred to as a "top mount". The forces introduced into the spring or damper are transferred to the vehicle structure via the support mount.

A bearing of the type mentioned above may also be used in air springs of motor vehicles in order to protect the air spring bellows from damage by torsion, since torsional movements can occur even with non-steered axles due to the axle kinematics.

In order for the bearing to function properly, it is necessary to protect the bearing from contamination. For this purpose it is known to seal the bearing device by means of a sealing system.

In US 2015/0367698 A1, a strut mount having two housing parts and a slide bearing arranged between the two housing parts is disclosed, with the slide bearing being sealed by a labyrinth seal formed by both housing parts.

In U.S. Pat. No. 9,261,134 B2 and WO 2015/199022 A1 strut mounts having two housing parts are disclosed, with a slide bearing arranged between the two housing parts, the slide bearing being sealed against media influences by means of two sealing lips.

SUMMARY

The present invention is based on the problem of creating a bearing for a support mount that has an improved sealing and can be manufactured cost-effectively.

In order to solve the problem, a bearing having the features of claim 1 is proposed.

Advantageous embodiments of the bearing are disclosed in the dependent claims.

According to the invention, the bearing for a support mount has a first housing part and a second housing part between which a housing gap is formed, wherein a bearing device is arranged in the housing gap, wherein a sealing system is provided which seals the housing gap, the sealing system having at least one first sealing lip which is of pivotable design, wherein the first sealing lip is spaced apart from the first housing part and/or the second housing part in the non-sealing state and pivots for sealing the housing gap and bears against the first housing part and/or the second housing part.

The bearing is preferably used in a support mount for a motor vehicle. A motor vehicle is understood to be both a passenger vehicle and a commercial vehicle. The bearing may be used in a strut support mount to allow rotation between a vehicle body and a spring being part of the strut. Furthermore, the bearing may also be used with an air spring to compensate for torsional movements caused by bump-steer on steered and non-steered axles, for example during compression.

As soon as an external media jet, such as a water-particle-mixture, hits the first sealing lip, the first sealing lip pivots and rests against the first housing part and/or the second housing part and closes or seals the housing gap. The bearing device is therefore effectively protected against external media influences and thus against contamination. Since the first sealing lip is spaced from the first housing part and/or the second housing part in the non-sealing state, a contactless sealing system is created in the operating state, so that only low breakaway torques and hence low torques are required for a rotational relative movement of the two housing parts. In addition, the sealing system has a good sealing effect in the operating state. When no media jet hits the first sealing lip any more, the first sealing lip pivots back into its state spaced from the first housing part and/or the second housing part, so that medium that has entered the housing gap can flow out of the housing gap. Since the sealing system is arranged between the two housing parts, the bearing device can be protected in a highly effective manner and at the same time cost-effectively against media and environmental influences.

In an advantageous embodiment, an approximately horizontally extending first gap is formed between the at least first sealing lip and the first housing part and/or the second housing part. It is advantageous that the first gap has a length of at least 5 mm. The length of the approximately horizontal first gap corresponds to the distance from a free end of the first sealing lip to the beginning of the housing gap or of a first chamber. This creates a support with sufficient surface area for the contact of the first sealing lip. In addition, a penetrating medium, such as a fluid, must first cover a certain distance before it penetrates into the housing gap or a first chamber. This creates an improved seal. 'Approximately horizontal' means that the first gap is horizontal or that the first gap is at an angle equal to or less than 5° to a central axis of the bearing.

In an advantageous embodiment, the first sealing lip protrudes approximately horizontally from the first housing part and/or the second housing part in the non-sealing state. Since the sealing lip protrudes from the first housing part and/or the second housing part in the non-sealing state, a contactless sealing system is created. Thus, in the unloaded, non-sealing state, a low breakaway torque is required for a rotational relative movement of the two housing parts. In addition, when a medium impacts, the first sealing lip can pivot due to its horizontal arrangement and thus close the housing gap for sealing. In the sealing state, the sealing system works similar to a contacting sealing system where the sealing lip is in contact with the first housing part and/or the second housing part. 'Approximately horizontally projecting' means that the first sealing lip projects horizontally from the first housing part and/or the second housing part, or that the first sealing lip is aligned at an angle of 5° or less than to the first housing part and/or the second housing part.

In an advantageous design, the first sealing lip has a contoured surface on a side facing away from the first housing part and/or the second housing part. This allows the force required to pivot and to close the housing gap to be adjusted selectively. The first sealing lip may be tapered towards its free end on a side facing away from the first housing part and/or the second housing part.

In an advantageous design, the first sealing lip is adjoined by a first chamber. The first chamber, which is adjoining the first sealing lip, ensures a widening of the cross-section so that the pressure can be effectively reduced when a medium enters the housing gap. The chamber is advantageously designed in such a way that recirculation occurs in its interior and thus pressure can be reduced further when a medium penetrates. The first chamber is preferably located inside the housing gap. It is also advantageous that the first sealing lip limits the first chamber to the outside. Advantageously, the first chamber is integrated into the sealing system. Furthermore, it is advantageous that the first chamber is formed between the sealing system and the first housing part and/or the second housing part.

In an advantageous embodiment, the sealing system has a second sealing lip. The second sealing lip provides additional sealing of the housing gap if medium penetrates the housing gap, for instance if the first sealing lip is damaged. The second sealing lip is advantageously designed to be pivotable, the second sealing lip being spaced apart from the first housing part and/or the second housing part in the non-sealing state and being pivoted to seal the housing gap and resting against the first housing part and/or the second housing part. Thus the second sealing lip is designed as a contactless seal.

In an advantageous embodiment, the two sealing lips are arranged in series. This creates an effective sealing of the housing gap. The second sealing lip is only activated when medium enters the housing gap, for instance when the first sealing lip is damaged.

In an advantageous embodiment, the second sealing lip is arranged within the housing gap, wherein a second gap is formed between the second sealing lip and the first housing part and/or the second housing part. This means that the second sealing lip is only effective when medium enters the housing gap, for example when the first sealing lip is damaged. It is advantageous that the second gap between the second sealing lip and the housing part is directed upwards in an ascending direction, so that medium entering this housing gap has to ascend against gravity and can subsequently flow downwards.

In an advantageous embodiment, the second sealing lip borders the first chamber. When the pressure rises in the housing gap or in the first chamber when media enters, the second sealing lip rests against the first housing part and/or the second housing part and, by pivoting, closes and seals the housing gap or the second gap. Advantageously, the second sealing lip rests against a conical contact surface of the first housing part and/or the second housing part.

In an advantageous embodiment, the second sealing lip is bulged. In particular, the second sealing lip is bulged towards the first sealing lip. The curvature of the second sealing lip causes a recirculation of an entering medium. This results in a further reduction of pressure, so that further penetration of the medium into the housing gap is prevented. In addition, the curvature directed towards the first sealing lip causes the medium which has penetrated the second gap or the housing gap via the second sealing lip to subsequently flow out of the second gap or the housing gap due to gravity.

In an advantageous embodiment, the second sealing lip is adjoined by a second chamber. The second chamber causes a further pressure reduction due to its cross-sectional widening, when medium enters further into the housing gap via the second sealing lip. Advantageously, the second chamber is integrated into the sealing system. Further advantageously, the second chamber may be formed between the sealing system and the first housing part and/or the second housing part. Preferably, on one side facing away from the second sealing lip, the chamber is shaped in such a way that the medium entering the chamber is forced to recirculate out of the housing gap. For this purpose, the second chamber may be bent on a side facing away from the second sealing lip. Advantageously, the second chamber is arranged above the second sealing lip in such a way that a medium which penetrates this chamber can subsequently flow downwards unhindered by gravity.

In an advantageous embodiment, the sealing system is connected to the first housing part and/or the second housing part in a form-fit, force-fit and/or firmly bonded manner. This creates a simple and cost-effective connection between the sealing system and one or both of the housing parts. The sealing system may be pressed onto and/or glued to the first housing part and/or the second housing part. The sealing system may also be firmly bonded to the first housing part and/or the second housing part. Thus the sealing system and the first housing part and/or the second housing part may be manufactured by 2-component injection molding.

In an advantageous embodiment, the sealing system has a support section for supporting a spring element. Thus, the support section can be uniformly integrated into the sealing system in terms of material and can thus be produced cost-effectively.

In an advantageous embodiment, the bearing device has at least one slide bearing and/or one roller bearing. The slide bearing may have a slide body made of metal which is arranged between the two housing parts. Furthermore, the slide bearing may have two slide bodies which are arranged between the two housing parts. Both sliding bodies may be made of plastic. In addition, one of the sliding bodies may be made of plastic and the other may be made of metal or a hybrid material.

In an advantageous embodiment, a labyrinth seal is formed between the two housing parts. This further improves the sealing effect and prevents grease in the slide bearing or roller bearing from flowing into the housing gap. The labyrinth seal is preferably disposed downstream of the sealing system. The labyrinth seal consists of the two housing parts. Thus, one of the housing parts may have a projection which engages in a recess formed in the other housing part.

In an advantageous embodiment, the two housing parts are made of a plastic, and the sealing system is made of a thermoplastic elastomer. In this way, the sealing system can be manufactured firmly bonded with the first housing part and/or the second housing part using the 2-component injection molding process. If the sealing system has a contact section for the contact of a spring element, the elastomer support of the spring element can be uniformly integrated into the sealing system in terms of material. Advantageously, the two housing parts are made of fiber-reinforced plastic, in particular polyamide with a glass fiber content of more than 30%. The housing parts may have an additive that improves the sliding properties. In addition, the sealing system may be made of a vulcanized elastomer.

BRIEF DESCRIPTION OF THE DRAWINGS

In the following, the bearing, the sealing system and other features and advantages are explained in more detail using exemplary embodiments, which are shown schematically in the figures. Shown here.

DETAILED DESCRIPTION

Figure 1:
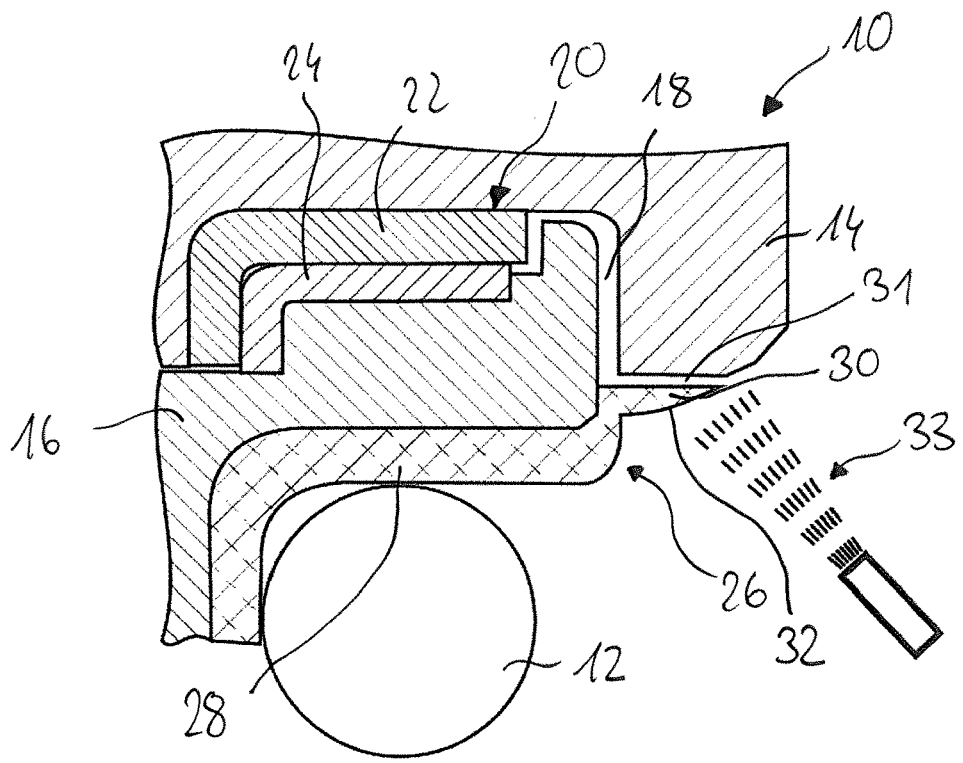
FIG. 1: an enlarged portion of a longitudinal section through a bearing in accordance with a first embodiment and a sealing system in accordance with a first embodiment.

FIG. 1 shows an enlarged portion of a bearing 10 for an unrepresented support mount loaded by a spring 12 which may be part of an unrepresented strut, in particular a McPherson strut, to allow rotation between an unrepresented vehicle body and the spring 12.

The bearing 10 has a first housing part 14 and a second housing part 16, between which a housing gap 18 is formed. A bearing device 20 is arranged inside the housing gap 18, via which the two housing parts 14, 16 can be rotated relative to one another. The first housing part 14 is supported by an unrepresented vehicle body, whereas the second housing part 16 is supported by the spring 12. Instead of the spring 12, the second housing part 16 can adjoin an unrepresented air spring. In this case, the second housing part 16 may, for instance, be part of a rolling piston of the air spring. Both housing parts 14, 16 are made of a plastic, especially a fiber-reinforced plastic.

The bearing device 20 has a first slide body 22 and a second slide body 24 which abut against each other in a sliding manner so that the two slide bodies 22, 24 slide against each other when the two housing parts 14, 16 are rotated against each other. The two slide bodies 22, 24 are connected to the respective housing parts 14, 16 in a form-fit, force-fit and/or firmly bonded manner. One of the slide bodies 22, 24 may be made of plastic, and the other slide body 22, 24 may be made of metal or a hybrid material. Furthermore, both slide bodies 22, 24 may be made of plastic.

A sealing system 26 is provided to seal the housing gap 18 against the penetration of a medium, such as a water-particle-mixture 33 shown in FIG. 1, which seals the housing gap 18. The sealing system 26 is made of a thermoplastic elastomer or a vulcanized elastomer and may be connected to the second housing part 16 in a form-fit, force-fit and/or firmly bonded manner. Preferably, the second housing part 16 and the sealing system 26 are manufactured uniformly in terms of material using the 2-component injection molding process.

The sealing system 26 has a support portion 28 for supporting the spring 12 and a first sealing lip 30 designed in a pivotable manner. The first sealing lip 30 is spaced from the first housing part 14 in the non-sealing state, while the first sealing lip 30 projects approximately horizontally from the second housing part 16 in the non-sealing state. The first sealing lip 30 has a contoured surface, in particular a slanted surface, on a side 32 facing away from the first housing part 14.

In the non-sealed state, a horizontally extending first gap 31 is formed between the first sealing lip 30 and the first housing part 14. The length of the first gap 31 is at least 5 mm, the length corresponding to the distance from a free end of the first sealing lip 30 to the beginning of the housing gap 18.

When a medium such as the water-particle-mixture 33 shown in FIG. 1 hits the first sealing lip 30, the first sealing lip 30 pivots and bridges the first gap 31 until the first sealing lip 30 abuts against the first housing part 14 and closes the housing gap 18. This effectively seals the housing gap 18 and prevents the penetration of the water-particle-mixture 33.

If the water-particle-mixture 33 enters the housing gap 18, it can flow out of the housing gap 18 as soon as the first sealing lip 30 returns, in particular swings back, into the undeformed state. This is the case when no more water-particle-mixture 33 hits the first sealing lip 30.

Since the first sealing lip 30 is spaced from the first housing part 14 in the non-sealing state, the sealing system 26 has a contactless function in the operating state, so that a lower breakaway torque is required for a relative rotation of the two housing parts 14, 16. At the same time, the sealing system 26 has a good sealing effect.

Further embodiments of the bearing and the sealing system are described below, using the same reference symbols for identical and functionally identical parts.

Figure 2:
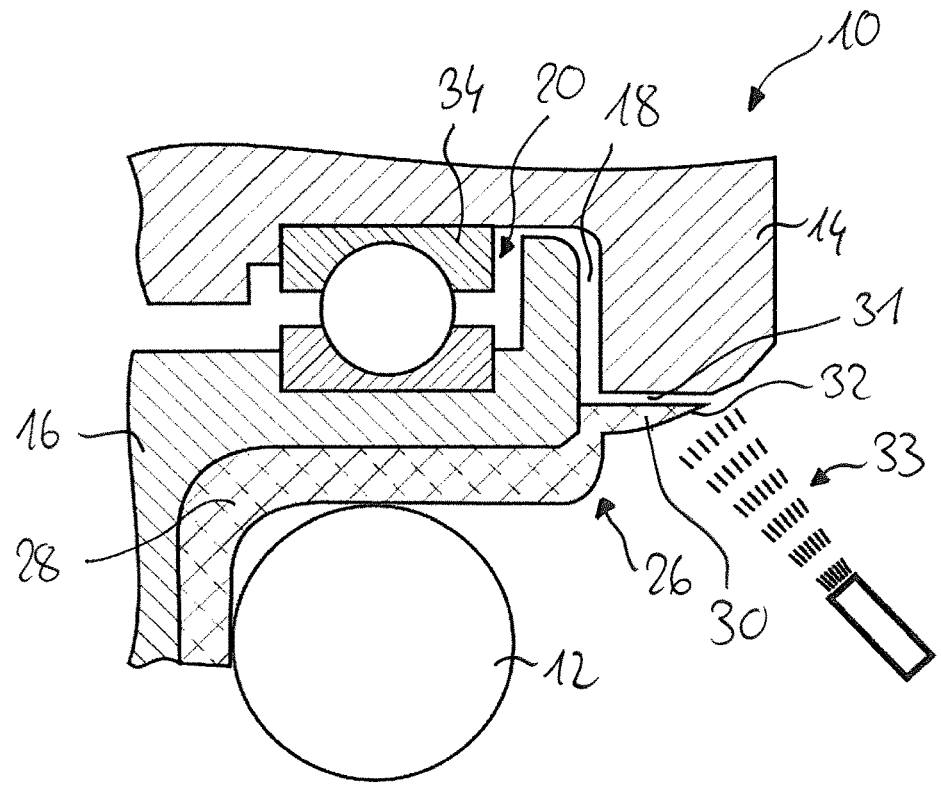
FIG. 2: an enlarged portion of a longitudinal section through a bearing in accordance with a second embodiment and a sealing system in accordance with a first embodiment.

FIG. 2 shows a second embodiment of the bearing 10, which differs from the first embodiment in that the bearing device 20 has a ball bearing 34 instead of two slide bodies 22, 24. The bearing device 20 has a ball bearing 34. The ball bearing 34 may be connected to the two housing parts 14, 16 in a form-fit, force-fit and/or firmly bonded manner.

Figure 3:
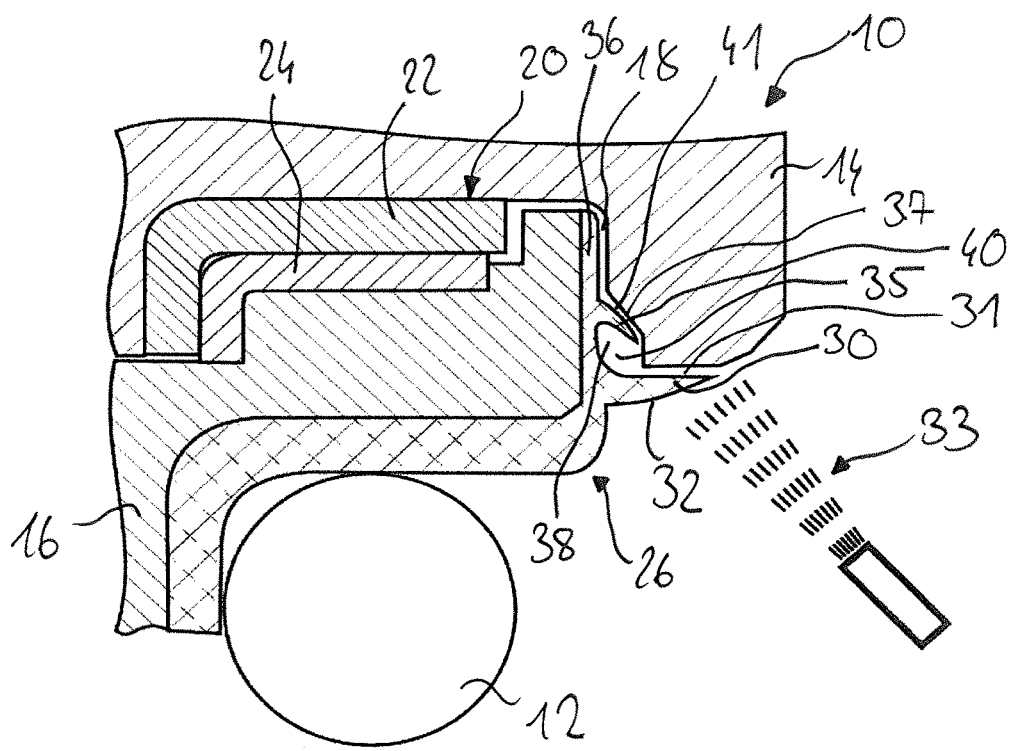
FIG. 3: an enlarged portion of a longitudinal section through a bearing in accordance with a third embodiment and a sealing system in accordance with a second embodiment.

FIG. 3 shows a third embodiment of the bearing 10 and a second embodiment of the sealing system 26, which differ from the other embodiments in the design of the first housing part 14 and the sealing system 26. The first housing part 14 has a recess 35 facing the sealing system 26. The recess 35 has a tapered abutment surface 37.

The sealing system 26 shown in FIG. 3 has an abutment portion 36 which rests against the second housing part 16. The first sealing lip 30 adjoins a first chamber 38 in the area of the recess 35, the chamber being inserted into the sealing system 26 and formed between the abutment portion 36 and the first housing part 14. The first chamber 38 causes a widening of the cross section and thereby causes a pressure reduction when medium enters the housing gap 18 via the first sealing lip 20. As shown in FIG. 3, the first chamber 38 is designed in such a way that recirculation occurs in its interior, thus further reducing the pressure.

As can also be seen in FIG. 3, the sealing system 26 has a second sealing lip 40 arranged inside recess 35. The second sealing lip 40 delimits the first chamber 38 and is arranged in series with the first sealing lip 30. The second sealing lip 40 is pivotable and bulged towards the first sealing lip 30. In the non-sealing state, the second sealing lip 40 is spaced from the tapered abutment surface 37, with a second gap 41 being formed between the second sealing lip 40 and the first housing part 14. Therefore, the second sealing lip 40 is also contactless and may serve as a backup for the first sealing lip 30 if the latter is damaged.

As the pressure rises in the first chamber 28, the second sealing lip 40 pivots and bridges the second gap 41 until the second sealing lip 40 abuts the tapered abutment surface 37 and closes the housing gap 18. Since the second sealing lip 14 is spaced from the tapered abutment surface 37 in the non-sealing state and is bulged towards the first sealing lip 30, medium that has entered the second gap 41 or the housing gap 18 via the second sealing lip 40 can flow out due to gravity.

Figure 4:
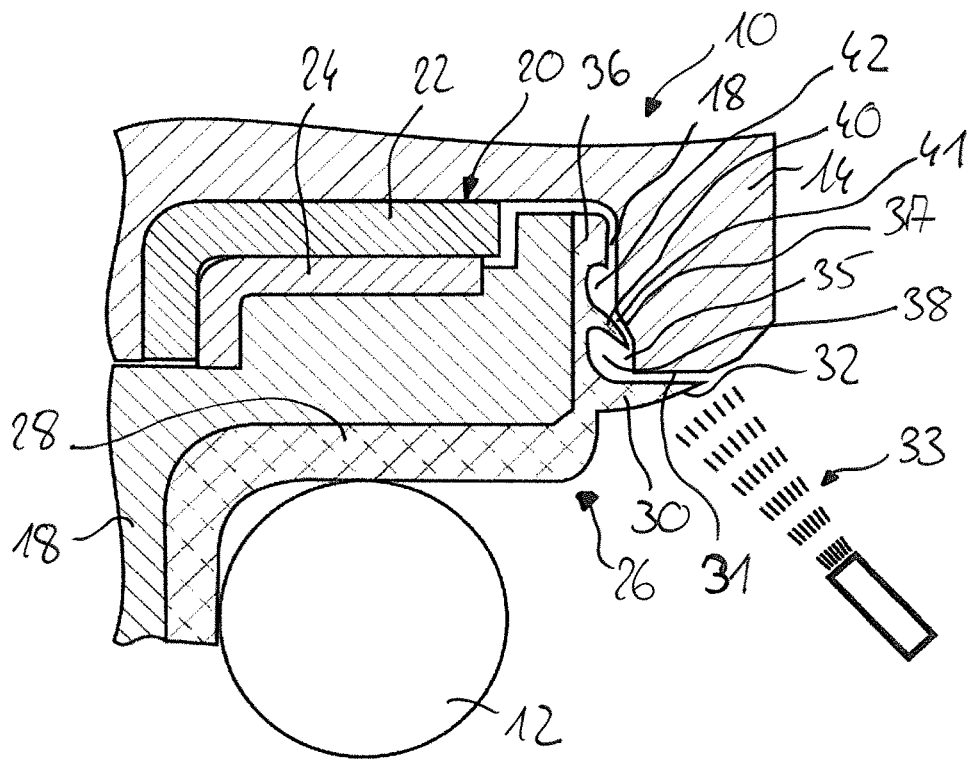
FIG. 4: an enlarged portion of a longitudinal section through a bearing in accordance with a fourth embodiment and a sealing system in accordance with a third embodiment.

FIG. 4 shows a fourth embodiment of the bearing 10 and a third embodiment of the sealing system 26, which differ from the third embodiment of the bearing 10 and the second embodiment of the sealing system 26 in the design of the housing gap 18 and the sealing system 26.

The housing gap 18 formed between the two housing parts 14, 16 is wider in comparison to the other embodiments in order to create space for a second chamber 42 immediately adjoining the second sealing lip 40. The second chamber 42 is incorporated into the sealing system 26, in particular the abutting portion 36. The second chamber 42 provides for a further pressure reduction due to its widened cross-section, if medium enters further into the housing gap 18 via the second sealing lip 40. As can also be seen in FIG. 4, the second chamber 42 on one side facing away from the second sealing lip 40 is shaped in such a way that entering medium is forced to recirculate in the direction of the second sealing lip 40, so that the medium can flow out of the housing gap 18.

Figure 5:
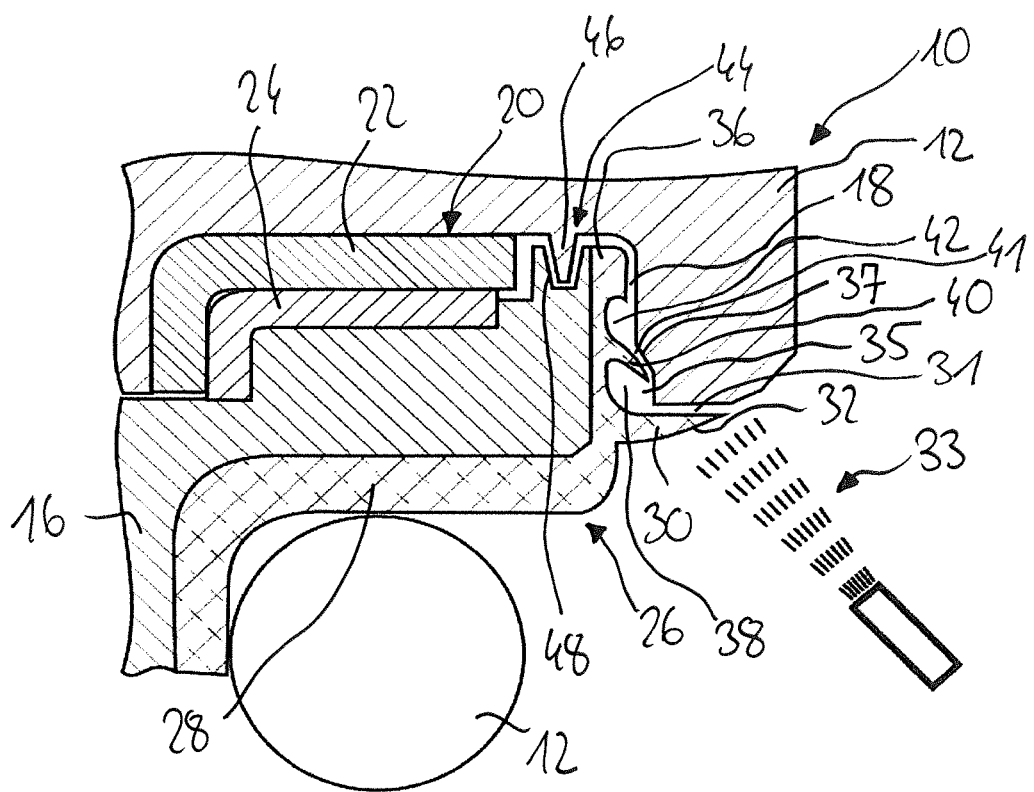
FIG. 5: an enlarged portion of a longitudinal section through a bearing in accordance with a fifth embodiment and a sealing system in accordance with a third embodiment.

In FIG. 5 a fifth embodiment of the bearing 10 is shown which differs from the fourth embodiment in that a labyrinth seal 44 is provided which is connected to the sealing system 26. The labyrinth seal 44 is formed by the two housing parts 14, 16, wherein the first housing part 14 has a projection 46 which engages in a recess 48 formed on the second housing part 16.

The invention claimed is:

1. A bearing for a support mount, the bearing comprising:
    a first housing part;
    a second housing part, and
    a housing gap formed between the first housing part and the second housing part;
    wherein a bearing device is arranged in the housing gap,
    a sealing system is provided which seals the housing gap,
    the sealing system includes at least one first sealing lip which is pivotable,
    the first sealing lip is spaced apart from the first housing part and/or the second housing part in a non-sealing state and pivots for sealing the housing gap and bears against the first housing part and/or the second housing part,
    the sealing system has a support portion for supporting a spring element, and
    the sealing system and the first housing part and/or the second housing part are manufactured by 2-component injection molding.

2. The bearing according to claim 1, wherein an approximately horizontally extending first gap is formed between the at least one first sealing lip and the first housing part and/or the second housing part.

3. The bearing according to claim 1, wherein in the non-sealing state, the first sealing lip projects approximately horizontally from the first housing part and/or the second housing part.

4. The bearing according to claim 1, wherein a first chamber adjoins the first sealing lip.

5. The bearing according to claim 1, wherein the sealing system comprises a second sealing lip.

6. The bearing according to claim 5, wherein the two sealing lips are arranged in series.

7. The bearing according to claim 5, wherein the second sealing lip is arranged within the housing gap, a second gap being formed between the second sealing lip and the first housing part and/or the second housing part.

8. The bearing according to claim 5, wherein the second sealing lip borders a first chamber.

9. The bearing according to claim 5, wherein the second sealing lip is bulged.

10. The bearing according to claim 5, wherein a second chamber adjoins the second sealing lip.

11. The bearing according to claim 1, wherein the bearing device has at least one slide bearing and/or one roller bearing.

12. The bearing according to claim 1, wherein a labyrinth seal is formed between the two housing parts.

13. The bearing according to claim 1, wherein two housing parts are made of a plastic and in that the sealing system is made of a thermoplastic elastomer.

\* \* \* \* \*